Oct. 5, 1965

J. P. WOODS ET AL 3,210,770

PLAYBACK SYSTEM

Original Filed March 31, 1961

ATTEST.

Charles F. Steininger

INVENTORS
John P. Woods
Tom Prickett Jr.
Edwin B. Neitzel
William M. Mullings
James K. Lyons

BY

ATTORNEY

United States Patent Office 3,210,770
Patented Oct. 5, 1965

3,210,770
PLAYBACK SYSTEM
John P. Woods, Dallas, Tom Prickett, Jr., Richardson, and Edwin B. Neitzel, Dallas, Tex., assignors to The Atlantic Refining Company, Philadelphia, Pa., a corporation of Pennsylvania
Continuation of application Ser. No. 99,858, Mar. 31, 1961. This application Feb. 25, 1964, Ser. No. 348,322
10 Claims. (Cl. 346—33)

The present application is a continuation of our copending application, Serial No. 99,858, filed March 31, 1961, now abandoned.

This invention relates to a recording system suitable for use with a field or office type recorder or computer. More specifically, the invention relates to an improved automatic signal switching and transducer indexing system designed to reproduce records in accordance with requirements peculiar to hydrocarbon exploration and interpretation.

Magnetic recording has been known and utilized for many years; and since World War II, the use of magnetic recording in geophysical exploration has increased at an impressive rate. However, in spite of the rapid increase in the use of magnetic recording in this field, to date no satisfactory recorder playback combination capable of meeting the peculiar requirements of hydrocarbon exploration has been invented. In the seismic field of geophysical exploration numerous devices are used in an attempt to furnish a field recorder operator with a high speed, economical, and satisfactory visual check or monitoring apparatus for determining the success of the magnetic recorder in capturing seismic reflections in readable form. With a proper monitoring apparatus the operator can quickly determine after each firing if the recordings are satisfactory. If one or more of the channels are not recorded in a readable form, a second shot or series of shots can be fired before the party moves on to its next location. By using the proper monitoring means, the party is able to save thousands of dollars in time, explosives, etc., that would normally be required in "reshooting" positions at later dates. Various display or monitoring systems are used today in conjunction with magnetic recorders to check the readability of recorded signals. Photographic oscillographs, fluorescent screens, and various types of recording pen systems are common devices for providing a visual check of magnetic recording. Probably, one of the most satisfactory answers to the basic monitoring requirement is found in United States Patent No. 2,803,515. This patent discloses a magnetic field recorder and playback combination that simultaneuosly records a number of seismic signals and thereafter, for monitoring purposes, sequentially, channel by channel, transcribes the recorded seismic signals on Teledeltos paper. The device may be made to repeat the reproduction of any channel by actuating a repeat switch or may be made to return to the start position by actuating a manual reset button. Although the patent provides a satisfactory basic field recording and playback combination, it is not versatile enough to meet the overall requirements of hydrocarbon exploration. Since this type of exploration is highly specialized and complex, the modified conventional type playback or transcribing system as discussed above is not satisfactory. Due to the peculiar requirements of this specialized type of exploration, a desirable playback apparatus, in addition to affording a visual monitoring means, must also provide some type of control means designed to present the transcribed information in a manner suitable for the particular purpose for which the information is to be used. Ideally, this apparatus should also be versatile enough to be used with either a field recorder where the transcribing drum is approximately 8 to 12 inches in length or with a central office computer where the drum is from 4 to 5 feet in length. This extreme variation in drum length imposes severe requirements of flexibility on the switching system as well as on the pen indexing portion of the playback combination.

First, with reference to the control means requirements mentioned above, it is highly desirable in all hydrocarbon exploration and interpretation operations, and mandatory in some, that the apparatus be versatile enough to (1) be able to select the recorded channels to be transcribed, (2) be able to adjust the width of the transcribed channels, (3) be able to adjust the distance between the edge of the transcribing medium and the first transcribed channel, (4) be able to provide a center gap or an area on the transcribing medium for noting seismic information and computations, (5) be able to adjust the center gap as to width and location, and (6) be able to start and stop the transcribing apparatus at any desired location. The above versatility is utilized, all or in part, either in the field to aid the monitoring operations or in an installation to aid record interpretation operations. The operator in the field, in addition to utilizing the monitoring and control means to check recording quality, uses it to determine the type and quality of filtering required to overcome noise and interference inherent in the area being surveyed. The magnetic channels that he desires to monitor or the number of geophones used in the particular survey will, in most cases, dictate the recorded channels to be transcribed, the width of the edge gap, the width and location of the transcribed channels and the width and location of the center gap. The use of such a versatile playback system is even more essential when the magnetic recordings are utilized in a computer installation. Here, the playback system is used for such operations as transcribing new records received from the field, refiltering the new records, transcribing and refiltering for comparative purposes old records taken in the same area or similar areas, transcribing new or old logs made in the same area, and presenting desired combinations of the above information on the same playback medium for correlation purposes. In accordance with the studies to be made, the different records to be used, and the number of channels to be transcribed, the width of the edge gap, the width of the transcribed channel, and the location and width of the center gap are determined. In addition to the above types of presentation, the playback system must also be able to change previously recorded exploration data into cross sections of the areas previously explored.

In summary, it is obvious that a playback system satisfactory for hydrocarbon exploration and interpretation purposes cannot be one limited to transcribing seismic data in a stereotype form. This is especially true since it is frequently desirable to transcribe seismic information, appropriately recorded well logging information, as well as other types of exploration information, on the same medium so that visual or automatic correlations between the different information can be made. Therefore, a satisfactory playback system must be versatile enough (1) to accommodate itself to operate on various types of recorded information and (2) to transcribing the information in the form that will facilitate interpretating the particular information transcribed.

It is, therefore, an object of this invention to provide a versatile automatic playback system usable with either a field recorder or office computer and incorporating controls so that the transcription can be made in a form suitable to the interested party's needs.

Another object of the invention is to provide an automatic playback means capable of transcribing various types of previously recorded hydrocarbon exploration information in a form best suited to facilitate interpretation of the information.

Another object of the invention is to provide a compact, transportable, and rugged playback unit capable of being utilized either in the field or in an office.

Another object of the invention is to provide a simplified playback system exhibiting a minimum of moving parts and adapted to provide fast accurate records and dependable service under field conditions.

Another object of the invention is to provide a switching system with means to adjust the transcription channel width, edge gap width and center gap width, means to locate the center gap and select the desired channels to be transcribed, and a means to start and stop the system at the desired positions.

Another object of the invention is to decrease the size, weight and power consumption of the switching system and at the same time increase the dependability of operation.

In the drawings:

FIGURE 3a is a block diagram of a portion of a counter-transistor switching matrix and its start and reset circuit.

FIGURE 3b shows a resistor connection used in the matrix.

FIGURE 3c shows an alternate start and reset circuit for use with the matrix shown in 3a.

Briefly stated, the preferred form of the invention is concerned with an automatic playback system in which a switching means connecting magnetic read heads to a transcribing pen indexing means allows settings to be made to control the form and sequence of transcription. The novel switching matrix and control circuitry, as well as the indexing device, are designed for minimum physical wear and simplicity of operation so that they can function in the field or in the office with a minimum of maintenance.

Within the broad statements of the invention as given above, there are numerous combinations and subcombinations of apparatus which are in themselves novel and which will be so recognized as the inventions are described in detail.

Figure 1:
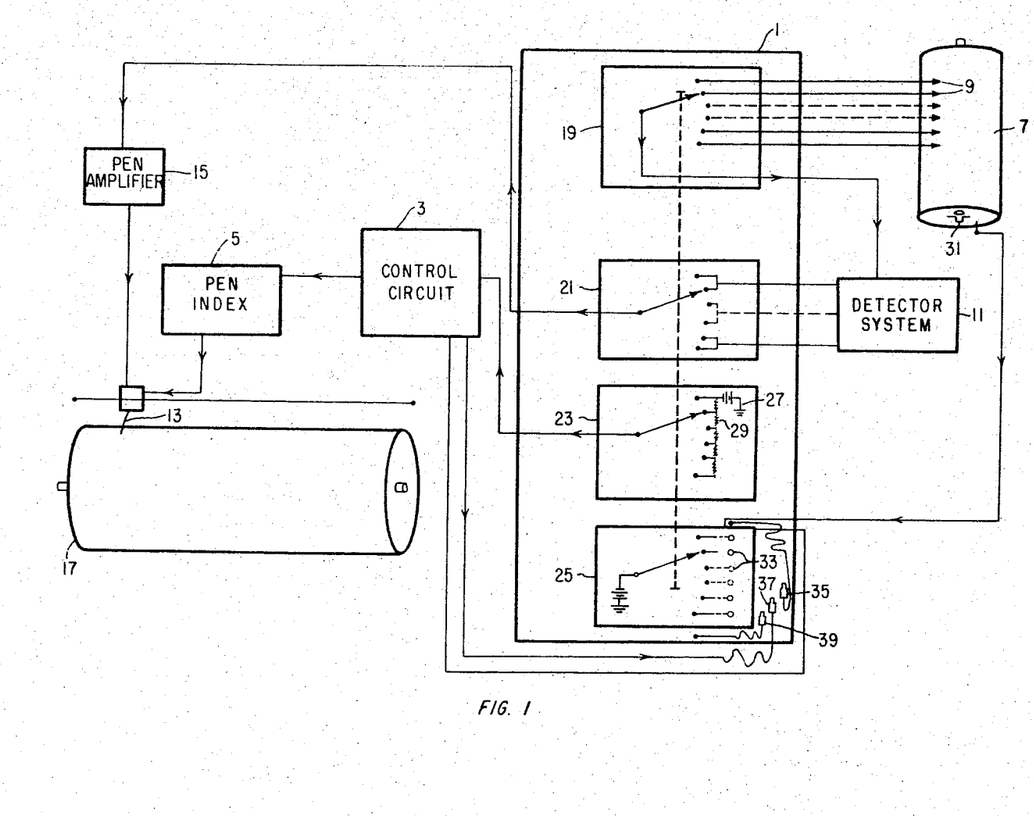
FIGURE 1 is a simplified diagram of a playback system.

FIGURE 1 is a schematic diagram of one possible combination of applicants' invention and conventional recording and transcribing devices. Applicants' invention is shown as playback switching system 1, playback switching control circuit 3, pen indexing system 5, magnetic recording drum 7, magnetic heads 9, detector system 11, transcribing pen 13, pen amplifier 15, and transcribing drum 17.

In a further and more detailed description of the invention reference will first be made to each invention in its broad application and then to some of its specific variations.

*Recorder switching system and control circuit*

The basic function of the switching system is to automatically and selectively connect read and write means so that previously recorded data are automatically transcribed as directed by instructions set in associated control means. The basic function of the control means is to command the indexing system to position the transcribing element so that it reproduces the data in a preselected manner compatible with requirements peculiar to hydrocarbon exploration and interpretation activities. The control means may physically be a part of or separate from the switching system, as will be explained in the appropriate subheadings to follow.

Figure 2:
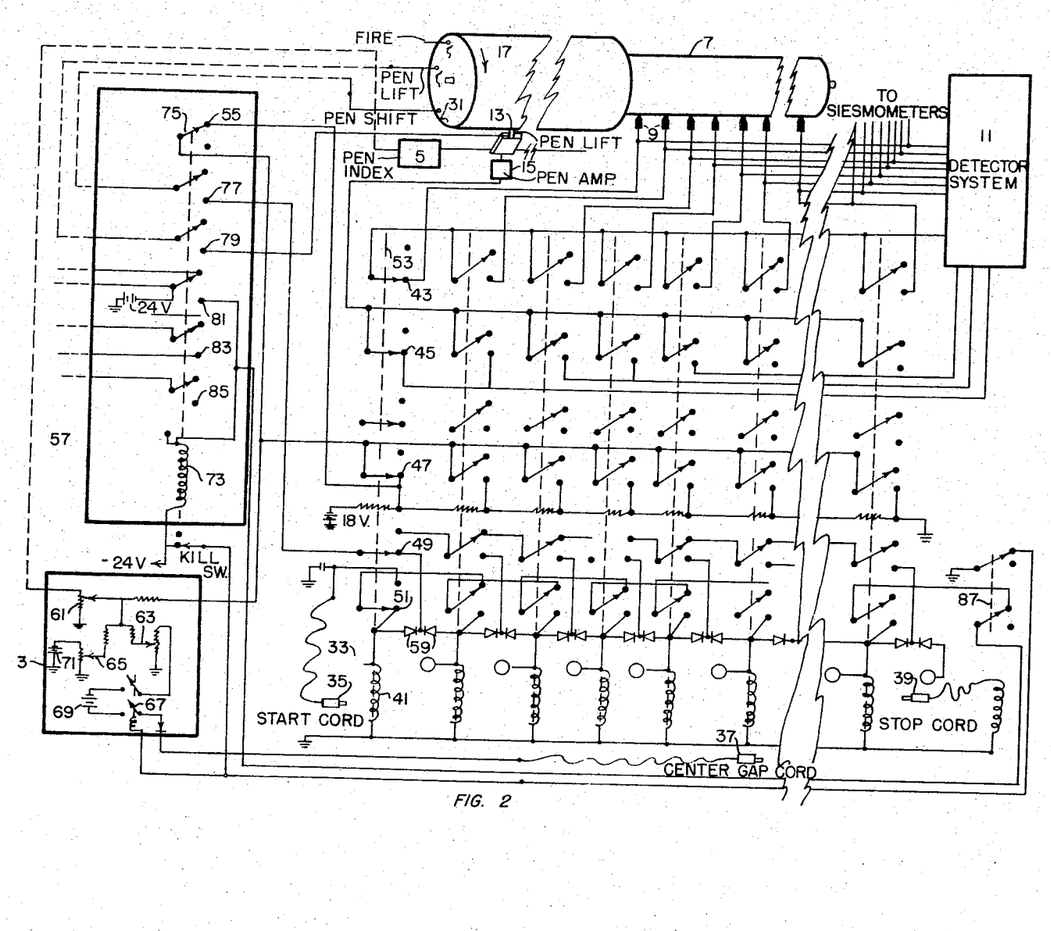
FIGURE 2 is a circuit diagram of a relay-diode switching matrix and a control circuit.

FIGURE 1 discloses an over-all recording and transcribing system in which the major components are shown in block form. Novel variations of the basic matrix 1 and control system 3 are shown in FIGURES 2, 3 and 4. Components, circuits and elements shown in FIGURES 2, 3 and 4 that are similar to those shown in FIGURE 1 are labeled with the same numbers. Playback switching matrix 1, FIGURE 1, is shown as a number of ganged sequential multicontact switches 19, 21, 23 and 25. Multicontact switch 19 connects magnetic heads 9 to detector system 11. Multicontact switch 21 connects an output of detector 11 to the input of pen amplifier 15. Multicontact switch 23 connects a voltage source 27 through a resistor system 29 and control circuit 3 to the input of pen indexing means 5. The pen index may include a servo mechanism, a motor drive mechanism, or a simple circuit connected to the device depending upon the type of pen index used. Switch 25 is connected to ramp switch 31 on magnetic recording drum 7 and is designed to be pulsed by each revolution of the drum. Each time switch 25 is pulsed by switch 31, the next succeeding contact on the switch is closed, thus moving 25 and its ganged switches 19, 21 and 23 to their next succeeding contacts. Switch 25 contains receptacles 33 for start patch plug 35, center gap plug 37 and stop plug 39. As will be explained in detail hereinafter, the proper connection of plugs and receptacles bridges the undesired switch contacts and locates the desired center gap on transcribe drum 17.

Control circuit 3 converts preset transcribing instructions into proper command voltages for the pen index system. As will be detailed in the pen index subheading, the type of pen index used determines the type of control circuit required. Control circuit 3, FIGURE 2, produces a command voltage suitable for operating a servo-driven pen, as shown in FIGURE 5. Control circuit 3, FIGURE 4, produces an error voltage suitable to operate a conventional servo-driven lead screw index. If a pulse type indexing device, is used, the control system can be a simple circuit connecting a pulse circuit, such as switch 23, FIGURE 1, to the pen index. Of course, necessary relays and patch cords connections or the like are required, as described hereinafter, to avoid the undesired channels.

Operation of the playback switching matrix and control circuit in FIGURE 1 is as follows. Prior to the playback, the desired transcribe instructions are set in the control circuit. Start plug 35, center gap plug 37, and stop plug 39 are placed in the appropriate receptacles 33. The plug positions determine the magnetic channels to be replayed and the position of the center gap, as will be described in more detail in the matrix subheadings. Any or all of the above instructions may be varied after each transcribing operation or may be retained as long as appropriate.

After the desired adjustments have been made on the control circuit and patch board, the system is then ready for a fire-record-transcribe sequence or a transcribe sequence, depending on the purpose of the playback and the type recorder being used. Assuming that the desired information is already recorded on drum 7, the playback sequence is as follows. The proper magnetic head 9 is selected by the position of switch 19 which in turn is determined by switch 25 and the receptacle 33 in which start plug 35 is inserted. The magnetically recorded intelligence under the selected head is read out and sent through detector systems 11, switch 21, playback amplifier 15 to playback pen 13, where it is transcribed on a medium mounted on drum 17. During this operation, switch 23, which was simultaneously positioned along with 19 and 21, connects D.C. voltage 27 to control circuit 3 where a command voltage is developed. This command voltage causes pen index 5 to position playback pen 13 over an appropriate transcribe channel on drum 17. As playback pen 13 completes the transcription of the selected magnetic channel, drum 7 completes a single revolution causing pen shift ramp switch 31 to close producing a D.C. pulse. The D.C. pulse causes switch 25 to move to its next succeeding contact. If the succeeding contact is bridged by center gap plug 29, the next selected contact is activated. Since switch 25 is ganged to 19, 21 and 23, the appropriate contact on each switch is activated and the recorded information from the next selected magnetic head is transcribed on drum 17. This operation is repeated until the contact on switch 25, selected by stop plug 39, is energized. At that time, the D.C. pulse from the recording drum is short-circuited to ground, all switch contacts are cleared, and the playback sequence is complete.

*Relay-diode switching matrix*

Reference is now made to FIGURE 2 where the novel relay-diode switching matrix and control circuit are shown in their preferred use as part of a seismic field recorder. Of course, the switching matrix and control circuit are not limited to this use and can be utilized with equal facility in other recorders and computer systems. The drawing is an exaggerated form to emphasize the switching and control circuits and yet show a working arrangement with conventional computer elements. Dotted lines between components indicate that certain elements not essential to the invention have been omitted. For the sake of simplicity, timing and time break heads are not shown; however, with the information disclosed in FIGURE 2, modifications necessary to produce conventional seismic timing lines are obvious to one skilled in the art.

The basic operation of the system shown in FIGURE 2 can be generally the same as FIGURE 1; however, the control system and the switching matrix incorporate many additional novel features, such as will be appreciated from the description to follow.

The switching matrix consists of a preselected square or rectangular array of hermetically sealed relays, their contacts and oppositely poled diodes. The number of relays, relay contacts and the configuration of the array are determined by the switching operations to be performed and the number of information channels to be handled. For identification purposes, similar elements in each row of the array bear the same numbers. Relay windings 41 are arranged in a horizontal row and relay contacts 43, 45, 47, 49 and 51 extend in vertical columns above their respective relay windings. Each column of contacts is opened or closed by a plurality of ganged rotor arms 53 controlled by their respective relay winding 41. Contact 43 in each row of the array is connected to an individual magnetic head 9 located on drum 7. Contacts 45 are connected to detector system 11. Contacts 47 are connected to contact 55 in playback start relay 57. Contacts 49 are connected to their respective, oppositely poled diodes 59. Contacts 51 are connected between two adjacent diode groups 59 to their respective relay winding 41, and to its associated receptacle 33.

Control circuit 3 includes a plurality of potentiometers 61, 63, and 65, relay 67 and two D.C. voltage sources 69 and 71. Playback control switch 57 includes relay winding 73 operating ganged rotor arms 75 and contacts 55, 77, 79, 81, 83 and 85. Pen index 5 is connected through dotted line connection to potentiometer 61. Pen shift ramp switch 31 on drum 17 is connected through dotted line connection to the ganged rotor arm for contact 77. Relay 67, control circuit 3, is connected to center gap patch plug 37 and to stop relay 87.

Potentiometer 61 which is connected to pen index 5 and through contact 55 of switch 57 to contact 47 in the pen location circuit row of the switching matrix, acts as a summing resistor for the voltages developed in control circuit 3. This potentiometer determines the playback scale of the transcription made on drum 17 and adjusts its channel width. Potentiometer 63 which is connected between ground, relay 67 and potentiometers 61 and 65, determines the center gap location on drum 17. Potentiometer 65 is connected between D.C. source 71, ground and potentiometers 61 and 63. This potentiometer adjusts the width of the edge gap of the distance between the edge of the transcribing medium and the first channel transcribed. Briefly stated, potentiometer 61 acts as a summing resistor for the command voltages to be applied to the pen indexing means 5 throughout the transcribing cycle or until the cycle is interrupted. The input voltages from potentiometers 63 and 65 and from the selected pen location contact 47 are attenuated in equal proportions by the gain or summing potentiometer 61. Potentiometer 65 and the selected contact 47 always determine portions of the command voltages that are applied to index 5; however, the voltage drop across center gap potentiometer 63 is not applied as part of the command voltage until the selected contact 51 is reached. The particular contact 51 is selected by inserting center gap plug 37 into the selected contact's receptable 33. When the selected contact's winding is activated, the addition voltage drop across potentiometer 63 is added to the command voltage resulting in an additional movement of the pen index means 5 and a resulting gap between the selected channels on 17. D.C. source 69 connected to relay 67, control circuit 3, acts as a holding voltage after the relay in which center plug 37 has been inserted is deactivated. This maintains the additional center gap voltage as a portion of the total command voltage until the contacts 51 are deactivated by stop plug 39, as will be explained in detail hereinafter.

The complete operation of the relay-diode playback matrix and control circuit is as follows. The desired transcribe channel width is set in potentiometer 61, the center gap width is set in potentiometer 63 and the desired edge gap width is set in 65. For purposes of illustration, start patch plug 35 is placed in the first receptable 33, the center gap plug and the stop patch plug are set in the desired receptacles 33. Playback control relay 57 is manually or automatically actuated as desired. With this actuation, ganged rotors 75 drop to their lower contacts. When contact 81 is closed, a negative 24 volt source is applied through switch 87 in the hold circuit, through start plug 35 to its receptacle 33. The negative voltage actuates the first relay winding 41 causing its ganged rotors 53 to close. With the activation of the first relay the corresponding read head 9 is activated and pen index 5 is simultaneously commanded to position transcribe pen 13 to its appropriate channel on drum 17. The simultaneous actions are performed as follows. Ganged rotor arm 53 closes on contact 47. Since contact 55, relay 57 is now open a negative pulse is sent through contact 47 and its associated rotor arm 53 to control circuit 3. The applied voltage passes through the summing network producing an output voltage proportional to the settings on potentiometers 61 and 65. The command voltage is transmitted to the pen index which positions transcribe pen 13 according to the command voltage. During the time the transcribe pen is being positioned, contact 43 which was also closed by 53, activates the first magnetic head 9 causing it to read out the previously recorded information on drum 7 and transmit it through contact 43 and rotor arm 53 to detector system 11. After the signal is detected, it is passed through contact 45 and its associated rotor arm 53 to pen amplifier 15 where it is transcribed on drum 17 by pen 13. After drum 17 completes one revolution, ramp switch 31 is closed causing a negative pulse to pass through relay 57, rotor arm 75 and contact 77 to rotor arm 53, and contact 49 in the pulse circuit. The negative pulse is applied to the cathodes of the two oppositely poled diodes 59 in the hold circuit, making them both conductive with the result that the negative 24 volt voltage is passed through the diode to the next relay winding 41. The application of the negative voltage on the next relay winding activates the relay closing its ganged rotor arms 53 on its numbered contacts. The circuit to the preceding relay is then broken since the hold voltage is no longer applied and its ganged rotor arms 53 move from the numbered contacts to the open positions. With each revolution of drum 17, the next succeeding relay winding 41 or the next relay selected by the position of the center gap plug 37 is activated. As the next desired relay is activated, the appropriate magnetic head 9 transmits the previously recorded information through detector circuit 11 to pen amplifier 15 and playback pen 13. The detected, previously recorded information reaches pen 13 after the appropriate pen location command voltage has been applied to pen index 5 and playback pen 13 has been positioned over its new transcribe channel. When the relay winding 41, in which stop patch plug 39 is inserted, is reached, the negative 24 volt hold current is short-circuited to ground; and all of the relay windings 41 are de-energized.

*Counter-transistor switching matrix*

Figures 3A, 3B, 3C:
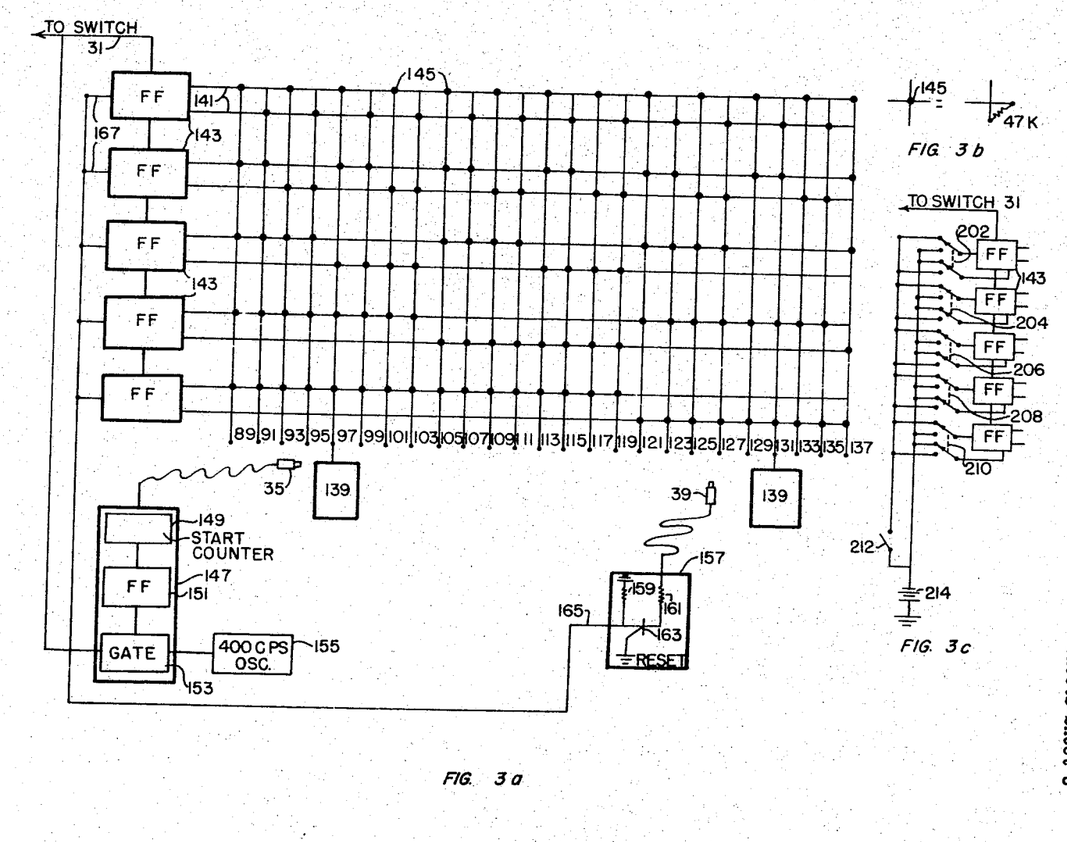
Figure 4:
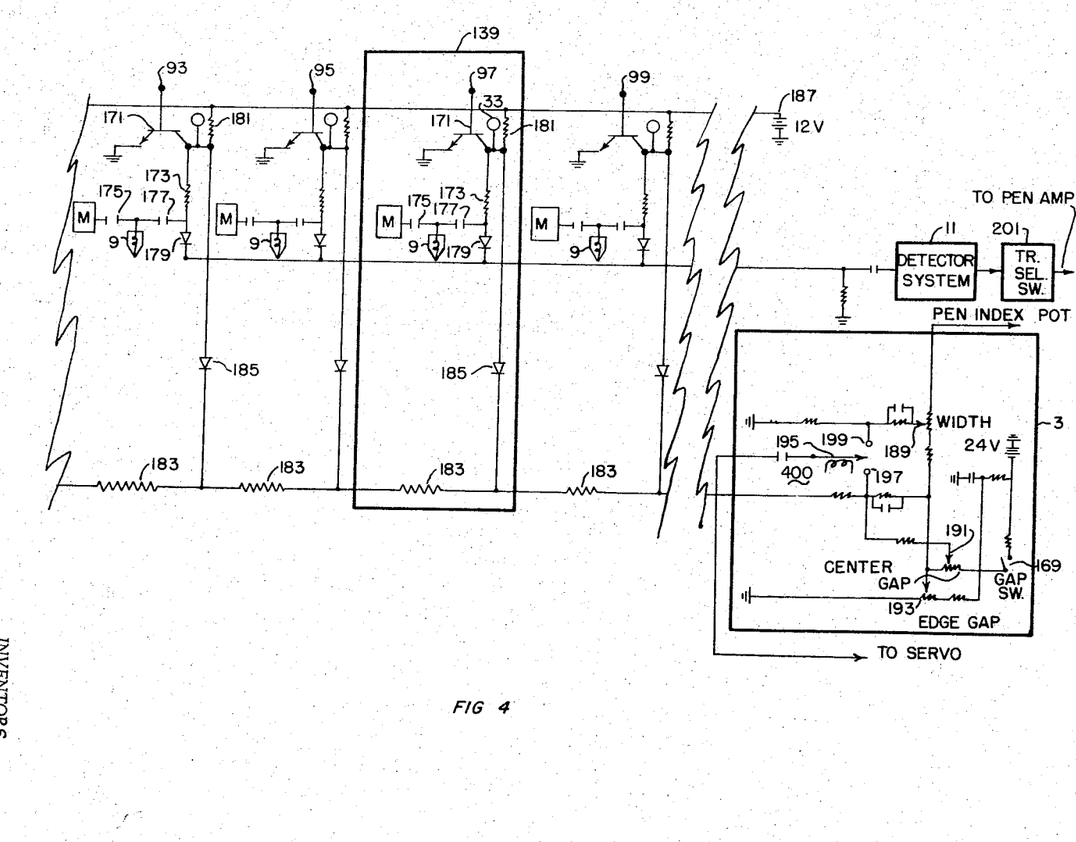
FIGURE 4 is a circuit diagram of a portion of the block diagram shown in FIGURE 3.

One possible use of the novel preferred counter-transistor playback switching matrix and control circuit is shown in FIGURES 3 and 4. In this variation, the recording drum systems and other circuitry not important to the inventive concept have been omitted for purposes of simplicity. FIGURE 3a shows a portion of the switching matrix in which the column conductors terminate at odd numbers 89 through 137. Although each column conductor termination is connected to a circuit represented by a block 139, for purposes of simplicity, only two such blocks are shown. FIGURE 4 shows a number of block 139 circuits in detail and their relation to control circuit 3, pen index 5 and detector system 11. The transistors shown in FIGURES 3 and 4 are the NPN type; however, the PNP type can be used with necessary changes well known to one skilled in the art.

Referring now to FIGURE 3a, the counter-transistor playback switching matrix utilizes a square or rectangular array of horizontal conductors 141 and vertical conductors identified by their terminating points shown as odd numbers 89 through 137. As in the previously described matrix, neither the shape of the matrix nor the number of conductors used is important to the inventive concept. Row conductors 141 are connected to five transistorized binary counters or flip-flops 143 connected in cascade. Two succeeding row conductors are connected to the outputs of each counter 143. Each counter has two output voltages in the cleared condition. The upper output is zero volts, and the lower output is +12 volts. The row conductors are also connected to preselected column conductors by 47K ohm resistors 145, shown in FIGURE 3b. These resistors are located and connected so that, regardless of the output condition of the cascaded counters, the terminating point output of one column conductor is in the zero potential condition and the remainder of the terminating point outputs are in the plus volt condition.

Start circuit 147, FIGURE 3, includes counter 149 connected to flip-flop 151 which in turn is connected to gate 153. A 400 c.p.s. oscillator 155 is connected to gate 153 and 153 is connected to the input of upper flip-flop 153 in the conductor array. Reset circuit 157 includes resistor 159 and transistor 163. Output 165 of reset circuit 157 is connected to inputs 167 of flip-flops 143. Start patch cord 35 is connected to counter 149 and stop patch cord 39 is connected to reset 157. For purposes of simplicity, center gap patch cord 37, FIGURE 1, is represented as switch 169 in control circuit 3, FIGURE 4.

Refer now to FIGURE 4 which shows a detailed schematic of block 139 together with its adjacent block 139 circuits, detector system 11 and control circuit 3. The lower end of each column conductor shown in FIGURE 3 is connected to the similarly numbered base of a transistor 171 shown in FIGURE 4. Each block 139 circuit includes transistor 171 whose emitter is connected to ground and whose collector is connected in parallel to plug receptacle 33 and resistor 173. Resistor 173 is connected in parallel to magnetic head 9, isolating capacitors 175 and 177 and diode 179. The cathode of diode 179 is connected to the input of detector 11. One end of diode 179 is connected to the input of detector 11. One end of resistor 181 is connected in parallel with receptacle 33 and diode 185 which is connected with its respective resistor 183. The value of each resistor 183 is graduated according to the column conductor circuit to which it is immediately connected, as will be explained in detail hereinafter. The graduated resistors 183 are connected in series to control circuit 3. D.C. source 187 is connected in parallel to resistors 181.

For purposes of illustration, control circuit 3, FIGURE 4, is adapted to operate a conventional servo-driven lead screw indexing system; however, the switching matrix is not limited to operating with this type of pen indexing system. The control circuit is constructed to present an error voltage to a servo index, not shown, until a transcribing pen is positioned correctly. The basic components in the control circuit include width potentiometer 189, center gap potentiometer 191, and edge gap potentiometer 193, synchronous chopper 195 and terminals 197 and 199. Terminal 197 is connected through a voltage divider network made up of potentiometers 189, 191 and 193 so as to present a command voltage indicative of the desired transcribe pen position. Terminal 199 is connected to a pen index position potentiometer, not shown, and presents a voltage indicative of the actual position of the transcribing pen. As pointed out heretofore, each output resistor 183 is graduated in value depending upon the terminating circuit 139 in which it is located. In operation, the selected circuit 139 produces an output current, determined by the graduated resistor 183 through which it passes, that is applied to the voltage divided network made up of potentiometers 189 and 193. The output current applied to the voltage divider network develops a command voltage at terminal 197 indicative of the desired position of the transcribe pen 13. Synchronous chopper 195 compares the voltage appearing at 197 and the pen position voltage appearing at 199 and transmits the difference, or the error voltage, to the servo. The servo responds to the error voltage in a conventional manner positioning pen 13, FIGURE 1, until the voltage from the pen index potentiometer appearing at terminal 199 equals the voltage appearing at 197. As in the FIGURE 2 control circuit, the center gap voltage is not added to the voltage network until the matrix switches to the column conductor with the receptacle 33, containing the center gap patch plug. When this conductor is reached, the center gap voltage is also applied to the voltage divider to produce the center gap effect. For simplicity, the center gap patch connection is shown as center gap switch 169 and not as a patch cord.

Optionally used trace selector switch 201 can be connected between detector system 11 and transcribing pen amplifier 15 for the purpose of routing the detected signals into a desired pre-transcription operation. For purposes of illustration, assume that a 1600 c.p.s. timing signal followed by a seismic signal are to be detected and transcribed. The trace selector switch routes the timing signal to a divider circuit that reduces the timing signal to 100 c.p.s. after which it is transcribed. When the switching matrix moves to the next channel so the seismic signal is read to the detector, selector 201 is simultaneously switched so the detected seismic signal is routed to the seismic filter circuit before it is transcribed. Trace selector 201 can be a conventional transistor switching system and connected to the particular column conductor in the matrix so that it produces the described switching action.

Before discussing the complete operation of the switching matrix and its control circuit, shown in FIGURES 3 and 4, a brief study of the matrix clearing operation and circuit 91 operation is in order.

Referring to FIGURE 3a assume that it is desirable to instruct the switching matrix to commence operation on column conductor 97. Start patch plug 35 is inserted into receptacle 33 located in the circuit 139, FIGURE 4, that is connected to conductor 97. Flip-flop 151 in start circuit 151, FIGURE 3, sets start gate 153 to the "on" position, allowing the 400 cycle output from oscillator 155, to pulse the cascaded counters 143, until the output of column conductor 97 is changed to zero volts. The zero volt condition pulses counter 149, causing gate 153 to close, thus maintaining the selected column conductor output 97 in the start or zero potential condition for one drum revolution. As will be explained hereinafter, the receipt of a pulse after each drum revolution causes the next lower counter output in cascaded counters 143 to change to zero potential and by virtue of the row-column connections 145, the next column conductor output 99 changes to zero potential.

FIGURE 3c shows an alternate system for starting and resetting the matrix shown in 3a. This alternate system can be used in place of start circuit 147 and reset circuit 157. FIGURE 3c shows the system connected to the switching matrix in 3a but represented for sake of brevity as flip-flops 143 only. The system itself includes double pole, double throw toggle switches 202, 204, 206, 208 and 210, playback relay switch 212 which may be located as part of the playback relay 57, FIGURE 2, and negative bias source 214. Each toggle switch shown is connected to its respective flip-flop 143 so that when the switch is in the upper position the negative bias from 214 is applied to the base of one transistor and when the switch is in the lower position the bias is applied to the base of the other transistor, in the flip-flop. The transistor receiving the negative bias is cut off. Therefore, with the matrix connected as shown in 3a and with all toggle switches in the up position, vertical conductor 89 is forced to assume the "on" or zero volt condition. With toggle switch 202 in the down position the top flip-flop output voltages are reversed wherein vertical conductor 89 assumes the "off" or 12 volt condition and conductor 91 assumes the "on" or zero volt condition. If 204 only is moved to the lower position, third vertical conductor 93 assumes the "on" condition. If 206 only is moved to the lower position, fifth conductor 97 assumes the "on" condition. If 208 only is moved to the lower position, ninth conductor 105 is actuated and if 210 only is moved, seventeenth conductor 121 is actuated. If more than one toggle switch is actuated, the switching effect is additive; that is, if, for instance, the fourth vertical conductor 95 is the desired starting point for the playback operation, toggle switches 202 and 204 are moved to the downward position. The total biasing effect of these two switches causes their respective flip-flops to reverse their output conditions and by virtue of the conections 145, FIGURE 3b, vertical conductor 95 assumes the zero or "on" condition. The operation of circuit 139 connected to 95 is the same as if start circuit 147 were used. After transcribe pen 13, FIGURE 1, is indexed over the proper transcribe position, playback relay 212, FIGURE 3c, is actuated placing equal bias on the base of each transistor in each flip-flop thus placing flip-flops 143 in a condition to respond to stepping pulse from switch 31 on drum 7, FIGURE 1. At the end of drum 7's first rotation switch 31 pulses flip-flops 143, FIGURE 3c, causing the next vertical conductor following the preselected start conductor to assume the "on" condition as described in the operation of FIGURE 3a. This operation is continued until the vertical conductor connected to stop plug 39 (via receptacle 33, FIGURE 4) is placed in the "on" condition. With the system shown in 3c, stop plug 39 is connected directly to a conventional relay such as 212 in the bias circuit. This connection to relay 212 can be made through a conventional transistor switch and, therefore, is not shown for purposes of brevity. When the zero volt condition is applied to the stop plug, relay 212 is opened causing the matrix to clear to the vertical conductor selected by the actuated toggle switch as described above.

Refer now to FIGURE 4 for a brief study of the operation of circuit 139 which is the same regardless of whether start system 147, FIGURE 3a, or start system in FIGURE 3c, is used. After the matrix has been cleared and the preselected column output, i.e., 97 in FIGURE 3, is in the zero or "on" condition, this zero potential is applied to the base of transistor 171, FIGURE 4, connected to column conductor 97 in FIGURE 3. The zero potential causes 171 to cut off, allowing current to flow from the positive 12 volt source 187 through diode 179 and thus decrease the impedance of this diode to the signal from its associated magnetic head 9 in circuit 139. Zero voltage on the transistor base also allows current to flow through diode 185 and the chain of appropriately graduated resistors 183 to control circuit 3. It should be noted here that each resistor 183 is graduated in such a manner that the total resistance offered applies a different current to the control cricuit 3 depending on which circuit 139 is activated. This difference in current, as described heretofore, is applied to the control circuit producing the command voltage to position transcribing pen 13, FIGURE 1. It should also be noted that while the column conductor 97 output is in the zero volt condition, all other column conductor outputs, FIGURE 3, are in a positive volt condition. That is, all are positive but are not necessarily at the same value of positive voltage. The positive voltage causes the remaining transistors 171, FIGURE 4, to conduct to saturation, thus cutting off their respective diodes 179 thereby blocking the outputs from recording heads 9 and cutting off their respective diodes 185 thereby preventing current from flowing into control circuit 3. Modulator M represents the portion of the circuit connected to head 9 that is not important to the inventive concept.

For a complete summary of operations, refer now to FIGURES 3 and 4. Assuming again for purposes of illustration that the first four channels of previously recorded information on drum 7, FIGURE 1, are not desired and that start circuit 147 and reset circuit 157 are to be used, start plug 35 is placed in the receptacle 33 located in the circuit 139, FIGURE 4, connected to column conductor 97, FIGURE 3. Center gap plug 37, FIGURE 1, represented in FIGURE 4 as switch 169, is positioned in the proper receptacle. Stop patch plug 39 is positioned in the receptacle 33 that is located in the circuit 97 that is connected to the column conductor that succeeds the last channel desired to be replayed. The desired transcribe width is set on potentiometer 189, the desired center gap width on potentiometer 191, and the desired edge gap width on potentiometer 193, all of which are located in control circuit 3, FIGURE 4. When the equipment is turned on, cascaded flip-flops 143 are reset to their cleared position, as described above. That is, the flip-flops are cleared by gate 153 in start circuit 147, allowing the 400 cycle signal from 155 to be applied to the input of the cascaded flip-flop until the output of column conductor 97 reaches the unique zero volt condition. As the flip-flops are pulsed and the zero output condition moves from column conductor 89 toward 137, transcribed pen 13, FIGURE 1, is indexed over its respective transcribe channels by virtue of the command voltages being sent through control circuit 3, FIGURE 4, to pen index 5, FIGURE 1. When the zero potential condition is applied to start circuit 147 through patch plug 35, gate 153 is closed, thus maintaining the output of column conductor 97 in the zero condition for one drum revolution. As described above, the "on" condition of 97 causes the transistor 171 in circuit 139, FIGURE 4, to cut off and its diode 179 to conduct, thus allowing the signal voltage from the magnetic reading head 9 to pass through diode 179 through detector 11 to transcribe pen amplifier 15 and to transcribe pen 13, FIGURE 1. The signal read by the magnetic head 9, FIGURE 4, is transcribed to pen 13, FIGURE 1, during a single drum rotation, after which pen shift ramp switch 31 on recording drum 17, FIGURE 1, sends a negative 24 volt pulse to the input of the cascaded flip-flops 143. This pulse actuates the flip-flops so that the unique zero output is moved from column 97 to 99, as described above. With the application of the zero potential to the base of the transistor connected to the column conductor 99 the recording and pen positioning cycle is repeated as described above. The transcribe and pen shift cycle is repeated until the column conductor in which the stop plug 39 is inserted is reached. The stop plug is inserted in the receptacle 33 connected to circuit 139 following the last column conductor to be activated. At that time, the zero potential on reset circuit 157 produces a 12 volt pulse at output 165. By virtue of circuit 157's parallel connections 167 to each flip-flop 143, the reset pulse resets all flip-flops 143 as described above so that their upper output is zero volts and their lower output is +12 volts.

Pen indexing system

The pen indexing device 5, FIGURE 1, is designed to position playback pen 13 over the appropriate transcribe channel on drum 17, as directed by the playback switching matrix and control circuit 3. The type of control circuit used depends on the type of indexing device utilized. If it is desirable to use a servo-driven indexing device, a control circuit, such as shown in FIGURE 2 or 4, can be used to develop a command voltage to operate the pen index. As will be detailed hereinafter, the command voltage can be used to operate the servo in novel incremental steps or the command voltage can be compared with a second voltage to produce an error signal to operate a conventional servo indexing system. If the pen indexing mechanism is not servo-driven, the control circuit is modified accordingly. The novel pen indexing mechanisms to be described hereinafter are not limited in their operation and can be used on a field recorder or an office computer with equal accuracy. In addition, they are well suited for automatic, semiautomatic or manual operation, with or without a switching matrix. Although the index mechanisms are illustrated and described as pen indexing devices, it should be understood that if desired they can be used to position any type of read and/or write transducer or transducers to include magnetic heads, electric pens, ink pens, optical readout systems, etc.

Heretofore, most pen indexing systems have used servo-operated lead screws to position a read or write element over a desired portion of a drum or chart. The servo was operated by a conventional error voltage and rotated the lead screw until the error voltage was zero. It is well known that when such a servo mechanism is required to operate over a considerable linear distance the system loses much of its accuracy. In fact, when a conventional servo indexing device is used to move a pen housing over a distance greater than 12 inches, the problem of inaccurately located playback channels, etc., becomes serious. Applicants' novel invention has solved this problem by developing pen indexing devices capable of operating over distances much greater than 12 inches and still retaining a high degree of accuracy in locating the playback channels. Applicants' pen indexing devices, when operating over long drums, utilize an incremental stepping system which retains the high degree of accuracy inherent in a servo system operating over a few inches, and yet reduces the response time of such a system by a factor of two or three, depending on the particular species used. In addition to maintaining accuracy and reducing response time, applicants' devices overcome the problems of jitter, backlash, and servo-hunt by the use of a novel brake and clutch arrangement.

While there have been disclosed herein several specific preferred embodiments of the present invention, various modifications, omissions and refinements which depart from the disclosed embodiments may be adopted without departing from the spirit and scope of the present invention which is limited only by the following claims.

We claim:
1. A playback system for selecting and transcribing individual traces of a multitrace seismic magnetic record, comprising,
   (a) a first rotatable drum adapted to receive said record,
   (b) a plurality of magnetic heads for converting the seismic information into counterpart electrical signals disposed above said first drum such that each said head is associated with one of said traces,
   (c) a first multicontact switch for selecting individual ones of said traces for transcription arranged so that a separate one of its contacts makes electrical connection with each of said magnetic heads,
   (d) a second rotatable drum having an associated recording surface on which said selected traces are individually transcribed in visual form,
   (e) a transcribing pen movably mounted on support means such that said pen is in recording relation with said second drum,
   (f) a pen indexing device for locating said transcribing pen in predetermined recording positions relative to said second drum,
   (g) a voltage source to power said pen indexing device, and
   (h) a second multicontact switch having the same number of contacts as said first switch and adapted to operate in unison therewith, which second switch controls the voltage input to said pen indexing device through a resistor system.

2. A playback system in accordance with claim 1, wherein a third multicontact switch having the same number of contacts as said first and second switches controls and synchronizes the switching actions of said first and second switches.

3. A playback system in accordance with claim 2, wherein an electrical pulse source activates said third switch each time said first drum completes a revolution.

4. A playback system for selecting and transcribing individual traces of a multitrace seismic magnetic record, comprising,
   (a) a first rotatable drum adapted to receive said record,
   (b) a plurality of magnetic heads for converting the seismic information into counterpart electrical signals disposed above said first drum such that each head is associated with one of said traces,
   (c) a first multicontact switch for selecting individual ones of said traces for transcription arranged so that a separate one of its contacts makes electrical connection with each of said magnetic heads,
   (d) a second rotatable drum having an associated recording surface on which said selected traces are individually transcribed in visual form,
   (e) a transcribing pen movably mounted on support means such that said pen is in recording relation with said second drum,
   (f) a pen indexing device for locating said transcribing pen in predetermined recording positions relative to said second drum,
   (g) a voltage source to power said pen indexing device,
   (h) a second multicontact switch having the same number of contacts as said first switch and including a resistor system for controlling the voltage output from said voltage source,
   (i) a control unit connected to the output of said second switch for converting preset transcription instructions into proper command voltages for said pen indexing device,
   (j) a third muticontact switch having the same number of contacts as said first and second switches for controlling and synchronizing the switching actions of said first and second switches, and (k) an electrical pulse source connected to said third switch, which pulse source emits a pulse which activates said third switch each time said first drum completes a revolution.

5. A playback system in accordance with claim 4, wherein the third switch has a receptacle associated with each of its contacts and includes means suitable for connection therewith for selecting the traces to be transcribed and a center gap trace.

6. A playback system in accordance with claim 5, wherein said control unit includes a plurality of potentiometers which develop voltages to determine the width of the transcribed traces, the distance between the edge of the recording surface and the first transcribed trace, and the width and duration of the center gap.

7. A playback system for selecting and transcribing individual traces of a multitrace seismic magnetic record, comprising, (a) a first rotatable drum adapted to receive said record, (b) a plurality of magnetic heads for converting the seismic information into counterpart electrical signals disposed above said first drum such that each head is associated with one of said traces, (c) a first multicontact switch for selecting individual ones of said said traces for transcription arranged so that separate one of its contacts makes electrical connection with each of said magnetic heads, (d) a detector system connected to the output of said first switch for dissociating the desired seismic signals from any carrier signals, (e) a second multicontact switch having the same number of contacts as said first switch for receiving the output seismic signals from said detector system, (f) a pen amplifier connected to the output of said second switch for amplifying said seismic signals, (g) a second rotatable drum having an associated recording surface on which said selected traces are individually transcribed in visual form, (h) a transcribing pen connected to the output of said pen amplifier and movably mounted on support means such that said pen is in recording relation with said second drum, (i) a pen indexing device for locating said transcribing pen in predetermined recording positions relative to said second drum, (j) a first voltage source to power said pen indexing device, (k) a third multicontact switch having the same number of contacts as said first and second switches and including a resistor system for controlling the voltage output from said first voltage source, (l) a control unit including a plurality of potentiometers connected to the output of said third switch for converting preset transcription instructions into proper command voltages for said pen indexing device, (m) a fourth multicontact switch having the same number of contacts as said first, second, and third switches for controlling and synchronizing the switching actions of said first, second, and third switches, (n) a ramp switch connected to said first drum in a manner such that said switch is energized each time said first drum completes a revolution, and (o) a second voltage source connected to said fourth switch and to said ramp switch, which second voltage source sends an electrical pulse to said fourth switch each time said ramp switch is energized thereby causing said fourth switch to move one contact.

8. A playback system in accordance with claim 7, wherein said first, second, third, and fourth switches are ganged sequential switches such that each time said fourth switch moves one contact said first, second, and third switches move one contact.

9. A playback system in accordance with claim 8, wherein said first, second, third, and fourth switches include an array of relay contacts connected to a plurality of relays and divides.

10. A playback system in accordance with claim 8, wherein said first, second, and third switches include a plurality of transistors and said fourth switch includes an array of horizontal and vertical conductors interconnected in a predetermined manner and a plurality of binary counters connected to said horizontal conductors.

References Cited by the Examiner
UNITED STATES PATENTS

| | | | |
|---|---|---|---|
| 1,480,734 | 1/24 | Nelson | 346—139 |
| 2,378,389 | 6/45 | Begun | 346—21 |
| 2,579,831 | 12/51 | Keinath | 346—33 |
| 2,606,808 | 8/52 | Brown | 346—33 |
| 2,626,979 | 1/53 | Woods | 324—1 |
| 2,803,515 | 8/57 | Begun et al. | 346—33 |
| 2,876,428 | 3/59 | Skelton et al. | 340—15.5 |
| 2,926,984 | 3/60 | Gerbrands | 346—139 |
| 2,958,849 | 11/60 | Begun | 340—172.5 |
| 2,975,399 | 3/61 | Burns | 340—15.5 |
| 2,976,107 | 3/61 | Klein et al. | 346—109 |
| 2,986,722 | 5/61 | Williams | 340—15.5 |
| 3,014,650 | 12/61 | Skelton et al. | 235—61.6 |
| 3,028,579 | 4/62 | McCarter et al. | 340—15.5 |
| 3,041,578 | 6/62 | Elliott | 340—15.5 |
| 3,046,553 | 7/62 | Hawkins et al. | 346—17 |
| 3,047,836 | 7/62 | Johnson et al. | 340—15.5 |
| 3,048,847 | 8/62 | Forst et al. | 346—1 |
| 3,105,220 | 9/63 | Groenendyke | 340—15.5 |

LEYLAND M. MARTIN, *Primary Examiner.*

UNITED STATES PATENT OFFICE
CERTIFICATE OF CORRECTION

Patent No. 3,210,770                                                           October 5, 1965

John P. Woods et al.

It is hereby certified that error appears in the above numbered patent requiring correction and that the said Letters Patent should read as corrected below.

In the drawings, sheets 1 to 4, lower right-hand corner strike out "William M. Mullings" and "James K. Lyons" , each occurrence; column 2, line 71, for "palyback" read -- playback--; column 6, line 4, for "of" , second occurrence, read -- or --; column 7, line 61, for "153", second occurrence, read -- 143 --; column 8, lines 6 and 7, strike out "One end of diode 179 is connected to the input of detector 11."; line 38, for "divided" read -- divider --; column 10, line 62, for "transcribed" read -- transcribe --; column 13, line 28, strike out "said", first occurrence; line 29, after "that" insert -- a --.

Signed and sealed this 14th day of June 1966.

(SEAL)
Attest:

ERNEST W. SWIDER                                         EDWARD J. BRENNER
Attesting Officer                                  Commissioner of Patents